3,429,540
Patented Feb. 25, 1969

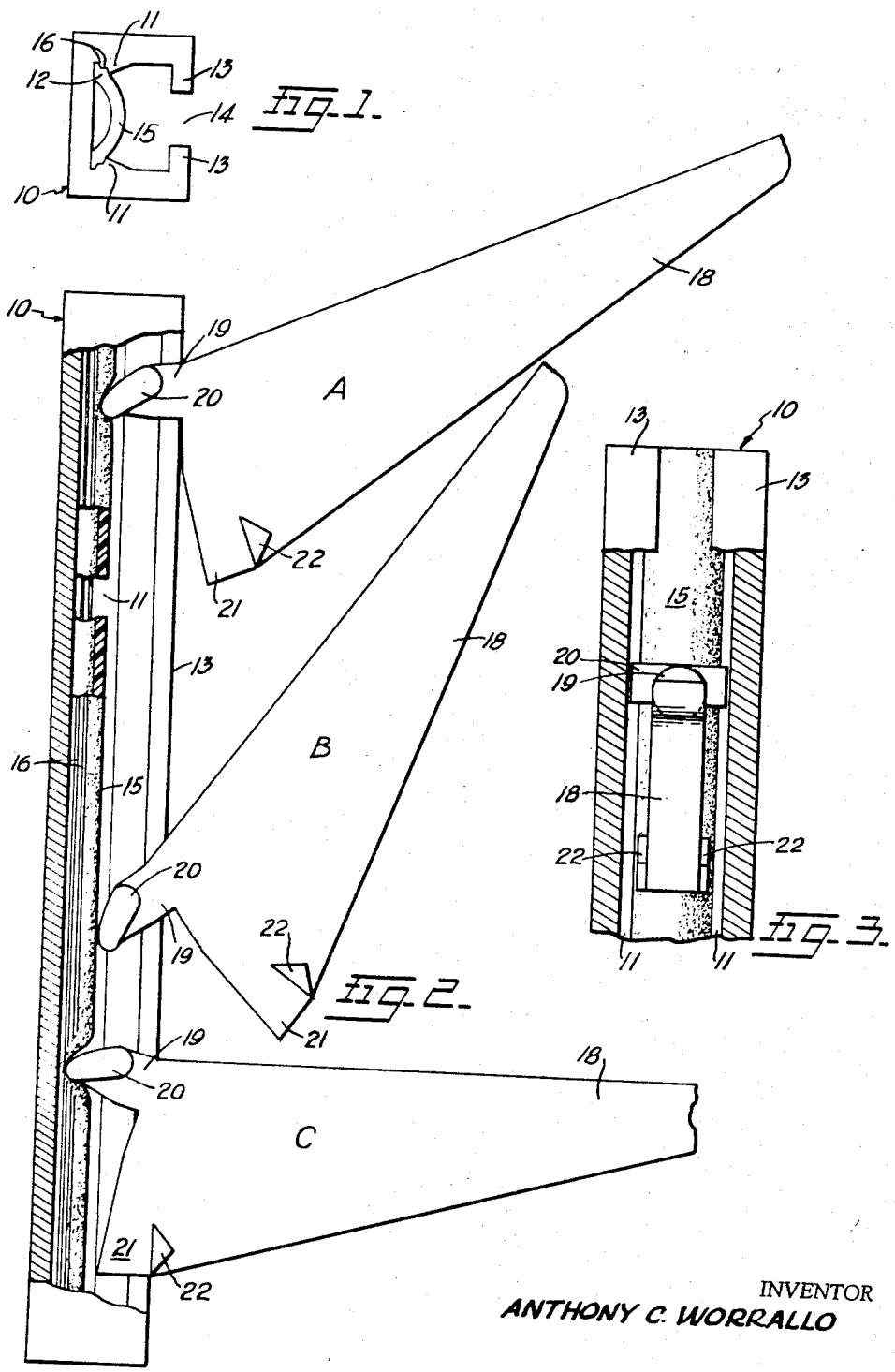

3,429,540
SELF-LOCKING BRACKET AND THE LIKE
Anthony Charles Worrallo, 15 Sprott Road, Kohimarama, Auckland 5, North Island, New Zealand
Filed May 1, 1967, Ser. No. 635,242
Claims priority, application New Zealand, May 30, 1966, 145,247
U.S. Cl. 248—246          4 Claims
Int. Cl. A47g 29/02

ABSTRACT OF THE DISCLOSURE

An adjustable, self-locking support, which can take the form of a shelf bracket or the like, of the type comprising a channel member and a bracket to be locked thereto, characterized by having an elongated deformable plastic insert extending within the channel member in such fashion as to serve both to cover the fasteners by which the channel member is mounted and to retain the bracket in its locked position.

---

This invention relates to an improved self-locking device for locating brackets on a lipped channel support member to form adjustable shelves, platforms, tables, hooks, bars, rungs, light fittings, furniture, demountable frames, running book-ends and the like.

Supports of the type comprising an elongated channel member and a self-locking bracket to be mounted on the channel member have frequently been proposed in the prior art. However, there has been a continuing need for improvement of such devices to provide for freer adjustment of the bracket, more positive locking of the bracket in its adjusted position, and, particularly to improve the appearance of the device by hiding the fasteners by which the channel member is secured.

It is accordingly a general object of the invention to devise an adjustable self-locking support device which satisfies the aforementioned need for improvement, without significantly increasing the cost of the device.

Another object is to provide a self-locking support of the type described wherein a single, inexpensive element is employed both to cover the fasteners by which the channel member is secured and to effect a simpler and more positive locking of the bracket.

Broadly stated, the invention embodies a channel member having a base wall, spaced side walls, and opposed flanges at the edges of the side walls spaced from the base wall, the channel member being secured by fasteners which extend through the base wall. An elongated, deformable plastic insert extends along the front face of the base wall of the channel member, being engaged between the side walls, the plastic insert having a curved, generally concavo-convex transverse cross-section and arranged to be concave with respect to the base wall of the channel. The deformable plastic insert both completely covers the fasteners which secure the channel member and cooperates in an improved fashion with the bracket member which is to be locked to the channel member. The bracket is of such configuration and shape that, in one angular position relative to the channel member, it may be moved freely along the channel member without effectively engaging the plastic insert. When swung to its locking position, the bracket member deforms the plastic insert toward the base wall of the channel, so that a portion of the bracket is wedged between the deformed plastic insert and the opposed flanges of the channel member in such fashion as to accomplish a positive locking of the bracket.

FIGURE 1 an end elevational view of the elevated structural member of generally lipped channel cross-section showing the plastic insert in position.

FIGURE 2 a side elevation view of a device constructed in accordance with one embodiment of the invention and employing the channel member of FIGURE 1, portions of the channel member being broken away for clarity, and three brackets being shown in different positions relative to the channel member.

FIGURE 3 a front elevational view of the device of FIG. 2 with parts broken away for clarity and illustrating a bracket in its locked position.

In the drawings 10 generally designates an elongated lipped channel support member.

On the inside of the side walls of the said lipped channel are inwardly protruding ridges 11 smooth on their forward facing surfaces and serrated on their rearward facing surfaces. The said ridges form a re-entrant shaped opening 12 on the forward facing inner rear wall of the lipped channel 10. Stated differently, ridges 11 each combine with the base wall of the channel member to define an inwardly opening groove adjacent the base wall of the channel member.

The lips 13 of the lipped channel 10 are spaced apart to provide an elongated opening 14 between which a bracket may slidably operate.

The plastic insert, brake or cover strip 15 is an elongated plastic member of generally curved cross-section. It is wider than the re-entrant shaped opening 12 with serrations 16 on edges of the outside of the convex curve to match the serrations in the ridges 11 of the lipped channel 10 which hold it in position. The plastic is inserted after the lipped channel 10 is screwed to the wall. The heads of any fasteners which may protrude are accepted into the concave recess 7.

The bracket used in conjunction with the said lipped channel is described in the form of a bracket suitable for supporting a shelf. This description is by way of an example only and it must be understood that the shape of the bracket or locking device may vary depending on the purpose it has to perform such as coat hook or lamp holder or the like.

As a shelf support the bracket will be generally triangular, as seen in FIGURE 3, comprising a forwardly extending arm 18 protruding outwardly from the outer surface of the lips 13 of the lipped channel 10.

A round neck 19 protrudes rearwardly and upwardly from the rear upper corner of the bracket 18. The diameter of the round neck 19 is less than the distance between the lips of the lipped channel 14.

Extending rearwardly from the said round neck 19 is a generally oval shaped locking lug 20. The shoulders of lug 20 extend beyond the round neck 19. The combined width of the shoulders of lug 20 is greater than the distance between the lips of the lipped channel 14 but less than the greatest distance between the inside faces of the side walls of the lipped channel 10.

The oval shaped lug 20 extends rearwardly further than the distance between the inside surface of the lips 13 and the outward facing convex surface of the plastic extrusion 15.

It will be appreciated that the rearmost surface of the said oval lug 20 is forced into the said plastic insert 15 to provide a lock with the forward facing shoulders of lug 20 acting against the rearward facing inside surface of the lips 13 of the lipped channel 10.

The depth of the lug 20 is less than the distance between the outward facing convex surface of the plastic insert 15 and the inside rearward facing surface of the lips 13 of the lipped channel 10.

It will be seen from position B that when the bracket 18 is tilted upwardly the forward facing shoulders of lug 20 disengage from the inner surfaces the lips 13 of lipped channel 10 and the rearward facing surface of oval lug 20 disengages from the plastic insert 15 allowing the oval lug 20 to be slidably moved freely up or down between the lips 13 of the lipped channel 10 yet still retain inside them. When forced downwardly again to position C the bracket will re-lock.

The depth of oval lug 20 is also less than the distance between the lips of the lipped channel 13. When the bracket is tilted upwardly into the unlocked position A it can be revolved on its round neck 19 between the lips 13 of the lipped channel 10 when the bracket is turned 90° onto its side the oval lug 20 may readily be removed or inserted between the lips 13 of the lipped channel 10.

The shortest side of the generally triangular bracket extends downwardly to a foot 21 of slightly greater width than the distance between the lips 13 of the lipped channel 10. When the bracket 18 is in the locked position C the foot 21 wedges between the lips of the lipped channel 10 to provide an additional friction lock.

Extending outwardly from each side and forward of foot 21 are two stops 22 which hold the bracket at the desired angle. Their rearwardly facing surfaces rest against the outside forward facing surface of the lips 13 of the lipped channel when the bracket is in locked position C. The stops 22 prevent foot 21 from damaging the plastic insert 15.

The stops 22 provide a leverage lock on the outside of the lips 13 of the lipped channel 10 between the lug 20 working on the inside of the lips 13 of the lipped channel 10. Lug 20 provides a further lock by imbedding its rearmost face into a plastic insert 15. Foot 21 adds a frictional lock by wedging between the lips 13 of the lipped channel 10.

As will be clear from comparison of the positions illustrated in FIGURE 2 at A, B, and C, bracket 18 is swingable between unlocked position B, in which lug 20 slants across the axis of channel member 10 at an angle such that the lug is not operatively engaged with the plastic insert 15, and locked position C, in which the lug is wedged between insert 15 and the lips or flanges 13 and, because of the width of lug 20, the plastic insert is deformed toward the base wall of the channel member by the nose of the lug.

What I claim is:
1. In an adjustable, self-locking support device of the type described, the combination of
    an elongated channel member comprising
        a base wall,
        transversely spaced side walls, and two elongated flanges each projecting from the free edge of a different one of said side walls toward the free edge of the other of said side walls, said flanges being spaced apart transversely of the channel member to define an elongated opening;
    an elongated deformable plastic insert having a curved, generally concavo-convex transverse cross-section and a normal width greater than the space between said side walls,
        said channel member being adapted to be secured in upright position to a mounting surface by fasteners extending through said base wall,
        said plastic insert being engaged between and retained by said side walls with said insert being concave with respect to said base wall and convex with respect to said opening, the concave surface of said insert being spaced from said base wall to provide a space to accommodate the fasteners by which said channel member is secured to the mounting surface; and
    a bracket comprising
        a body portion,
        a lug portion, and
        a neck portion interconnecting said body portion and said lug portion,
        said neck portion being dimensioned to be capable of extending through said opening,
        said lug portion being dimensioned to be accommodated within said channel member between said insert and said flanges, the length of said lug portion being greater than the width of said elongated opening, said lug portion having a width which is substantially greater than the distance between said flanges and said insert when said insert is in its normal, undeformed condition but less than the distance between said flanges and said base wall;
    said bracket being swingable longitudinally of said channel member, when said lug portion is therewithin, between an unlocked position, in which said lug portion slants across the axis of said channel member at an angle such that said leg portion is not operatively engaged with said insert, and a locked position, in which said lug portion is wedged between said plastic insert and said flanges and said plastic insert is deformed toward said base wall by the nose of said leg portion.
2. The combination defined in claim 1, wherein said leg portion has a generally oval cross-section with the major axis of the oval constituting the width of said lug portion and the minor axis of the oval being shorter than the width of said elongated opening.
3. The combination defined in claim 1, wherein said side walls each have an elongated inwardly opening groove adjacent said base wall and the edges of said plastic insert are engaged in and retained by the respective ones of said grooves.
4. The combination defined in claim 1, wherein said body portion of said bracket is flat and includes a foot portion spaced below said neck portion and disposed to engage in wedging fashion between said flanges as said bracket is swung into said locked position, said foot portion being provided with a stop disposed to engage one of said flanges to limit swinging movement of said brackets.

References Cited

UNITED STATES PATENTS 2,727,711  12/1955  Bally _____ 248—246

FOREIGN PATENTS 1,197,532  6/1959  France.
363,138  8/1962  Switzerland.
1,021,879  3/1966  Great Britain.

ROY D. FRAZIER, *Primary Examiner.*

J. F. FOSS, *Assistant Examiner.*

UNITED STATES PATENT OFFICE

CERTIFICATE OF CORRECTION

Patent No. 3,429,540                                                                February 25, 1969

Anthony Charles Worrallo

It is certified that error appears in the above identified patent and that said Letters Patent are hereby corrected as shown below:

Column 3, line 2, "retain" should read -- retained --; line 9, "channel 10 when" should read -- channel 10. When --. Column 4, lines 26, 31 and 33, "leg", each occurrence, should read -- lug --.

Signed and sealed this 24th day of March 1970.

(SEAL)
Attest:

Edward M. Fletcher, Jr.                                      WILLIAM E. SCHUYLER, JR.
Attesting Officer                                                       Commissioner of Patents